(12) United States Patent
Diachina et al.

(10) Patent No.: US 9,532,372 B2
(45) Date of Patent: *Dec. 27, 2016

(54) SYSTEMS AND METHODS FOR TRANSMITTING RADIO LINK CONTROL (RLC) DATA BLOCKS

(71) Applicant: TELEFONAKTIEBOLAGET L M ERICSSON (PUBL), Stockholm (SE)

(72) Inventors: John Diachina, Garner, NC (US); Paul Schliwa-Bertling, Ljungsbro (SE); Anne-Lott Hedberg, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/590,792

(22) Filed: Jan. 6, 2015

(65) Prior Publication Data

US 2015/0195851 A1    Jul. 9, 2015

Related U.S. Application Data

(63) Continuation of application No. 13/870,474, filed on Apr. 25, 2013, now Pat. No. 8,953,638, which is a
(Continued)

(51) Int. Cl.
*H04L 1/00*        (2006.01)
*H04W 72/12*    (2009.01)
(Continued)

(52) U.S. Cl.
CPC ......... *H04W 72/1242* (2013.01); *H04W 28/10* (2013.01); *H04W 72/1247* (2013.01); *H04W 28/065* (2013.01); *H04W 72/1268* (2013.01)

(58) Field of Classification Search
CPC ............... H04L 29/06068; H04L 29/06069; H04L 29/0653; H04L 29/0654; H04L 47/10; H04L 47/11; H04L 47/12; H04L 47/13; H04L 47/14; H04L 47/30; H04L 47/31; H04L 47/32
(Continued)

(56) References Cited

U.S. PATENT DOCUMENTS 5,557,608 A    9/1996 Calvignac et al.
5,754,764 A    5/1998 Davis et al.
(Continued)

FOREIGN PATENT DOCUMENTS

EP    0 582 537 A2    2/1994
EP    1 411 690 A1    4/2004
(Continued)

OTHER PUBLICATIONS

3GPP TS 44.060 V6.26.0 (Feb. 2009) "$3^{rd}$ Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 6)", Feb. 2009, the whole document.
(Continued)

*Primary Examiner* — Dady Chery

(57) ABSTRACT

In one aspect, the invention provides apparatuses and methods for wirelessly transmitting application data utilizing priority information for each radio link control (RLC) data block transmitted. Advantageously, the application data with a relatively high transmission priority is not substantially delayed by the transmission of application data with substantially lower transmission priorities.

4 Claims, 10 Drawing Sheets

Related U.S. Application Data continuation of application No. 13/553,458, filed on Jul. 19, 2012, now Pat. No. 8,503,479, which is a continuation of application No. 12/540,698, filed on Aug. 13, 2009, now Pat. No. 8,254,410.

(60) Provisional application No. 61/174,229, filed on Apr. 30, 2009.

(51) Int. Cl.
*H04W 28/10* (2009.01)
*H04W 28/06* (2009.01)

(58) Field of Classification Search
USPC   370/230, 329, 235, 229, 474, 473; 455/450, 452, 466, 445
See application file for complete search history.

(56) References Cited

U.S. PATENT DOCUMENTS

| | | |
|---|---|---|
| 6,466,544 B1 | 10/2002 | Sen et al. |
| 2003/0179726 A1 | 9/2003 | Forssell et al. |
| 2004/0120317 A1 | 6/2004 | Forssell |
| 2006/0020761 A1 | 1/2006 | Au et al. |
| 2006/0109864 A1 | 5/2006 | Oksman |
| 2007/0266122 A1 | 11/2007 | Einarsson et al. |
| 2008/0071924 A1 | 3/2008 | Chilukoor |
| 2008/0137564 A1 | 6/2008 | Herrmann |
| 2009/0049223 A1 | 2/2009 | Simkins |
| 2009/0323665 A1 | 12/2009 | Li et al. |
| 2010/0105390 A1 | 4/2010 | Ishii |
| 2010/0284338 A1 | 11/2010 | Persson et al. |

FOREIGN PATENT DOCUMENTS

| | | |
|---|---|---|
| JP | 2001-320417 A | 11/2001 |
| WO | WO 03/034757 A1 | 4/2003 |
| WO | WO 03/081817 A1 | 10/2003 |
| WO | WO 2008/105419 A1 | 9/2008 |
| WO | WO 2010/125457 A1 | 11/2010 |

OTHER PUBLICATIONS

"Enhanced Multiplexing for a Single RLC Entity (EMSR)", 3GPP draft; GP-100333, $3^{rd}$ Generation Partnership Project (3GPP), Mobile Competence Centre, 650, Route Des Lucioles, F-06921 Sophia-Antipolis Cedex, France, vol. TSG GERAN, no. Berlin; Mar. 1, 2010, Feb. 25, 2010 (Feb. 25, 2010), XP050416673, paragraph [9.1.11] paragraph [10.4.14a]; table 10.4.14a.

3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7), 3GPP standard; 3GPP TS 44.060, Mobile Competence Centre; 650, Route Des Lucioles; F-06921 Sophia-Antipolis Cedex; France, No. V7.17.0, May 1, 2009 (May 1, 2009), pp. 1-565, XP050378743, paragraphs [5.2.], [5.2.2], [5.5.1.9], paragraphs [8.1.1], [9.1.4], [9.1.11], [9.1.12], [10.4.9b], paragraphs [10.4.10], [10.4.12], [10.4.14.a], [10.4.16], table 10.4.14.a.

LG Electronics Inc: "UL scheduling for VoiP", 3GPP Draft; R2-062927_Uplink_Scheduling VoiP R6, $3^{rd}$ Generation Partnership Project (3GPP), Mobile Competence Centre; 650, Route Des Lucioles; F-06921 Sophia-Antipolis Cedex; France, vol. RAN WG2, no. Seoul, Korea; Oct. 16, 2006, Oct. 16, 2006 (Oct. 16, 2006), XP050132445, paragraphs [0001], [0003]; figure 1.

"3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)", 3GPP Standard; 3GPP TS 44.060, $3^{rd}$ Generation Partnership Project (3GPP), Mobile Competence Centre ; 650, Route Des Lucioles ; F-06921 Sophia-Antipolis Cedex; France, No. V7.16.0, Feb. 1, 2009 (Feb. 1, 2009), pp. 1-567, XP050378742, section 9.

3GPP TS 43.064 V6.11.0 (Jun. 2006), 3rd Generation Partnership Project, Technical Specification Group GSM/EDGE Radio Access Network; General Packet Radio Service (GPRS); Overall description of the GPRS radio interface; Stage 2 (Release 6), Jul. 17, 2006, pp. 22-23, 61.

US 9,532,372 B2

SYSTEMS AND METHODS FOR TRANSMITTING RADIO LINK CONTROL (RLC) DATA BLOCKS

CROSS REFERENCE TO RELATED APPLICATIONS

This application is a continuation of U.S. patent application Ser. No. 13/870,474 filed on Apr. 25, 2013, which is a continuation of U.S. patent application Ser. No. 13/553,458, filed on Jul. 19, 2012 (now U.S. Pat. No. 8,503,479), which is a continuation of U.S. patent application Ser. No. 12/540,698, filed Aug. 13, 2009 (now U.S. Pat. No. 8,254,410), which claims the benefit of U.S. Provisional Patent Application No. 61/174,229, filed on Apr. 30, 2009, the entire contents of which provisional application are incorporated by reference herein.

TECHNICAL FIELD

Aspects of the invention relate to the field of wireless telecommunications. More specifically, in one aspect, the invention relates to reducing transmission delay for high priority RLC data blocks.

BACKGROUND

General Packet Radio Service (GPRS) is commonly available in cellular telephone networks to transmit voice and other application data between a mobile station (MS) (e.g., a cellular telephone) and a base station. GPRS utilizes packet based communications. That is, application data transmitted between the MS and the base station is grouped into packets or protocol data units (PDUs). As used herein the term protocol data unit means data in a format specified by a protocol, which data includes a header containing protocol control information (e.g., address information for routing the protocol data unit) and possibly a data portion containing application data or another protocol data unit.

As illustrated in FIG. 1, an MS 102 may include one or more processes 105 (e.g., a voice call, a web browser, and a text messaging client) that send and receive application data to other devices attached to an external network (e.g., the Internet) via wireless communication 116 with a base station 104. As shown in FIG. 1, the MS 102 may typically include a multi-level GPRS protocol stack for converting PDUs created by the processes 105 (e.g., Internet Protocol (IP) packets) to PDUs suitable for wireless transmission over a GPRS network. The GPRS protocol stack in the MS 102 will usually include transport/network layers 106 (e.g., TCP/IP, UDP/IP, etc.), a logical link control (LLC) layer 108, a radio link control (RLC) layer 110 including at least one RLC engine 111 (i.e., RLC entity) for performing the functions of the RLC layer 110, and a media access control (MAC)/physical (PHY) layer 112. Each layer in the transmission protocol stack may receive a PDU from the layer above, perform various transformations on the received PDU (e.g., segmentation, adding additional headers, etc.), and transmit the resulting PDU(s) to the next layer. (For receiving data, each layer may receive one or more PDUs from the layer below, perform various transformations (e.g., reassembly of larger PDUs, removing headers, etc.), and provide the resulting PDU to the layer above.) For example, a process 105 may generate application data for transmission. The network layer 106 converts this data to a network layer PDU (e.g., an IP packet), the LLC layer 108 converts the network layer PDU to an LLC PDU, the RLC layer converts the LLC PDU to one or more RLC PDUs (i.e., RLC data blocks), and the MAC/PHY layer may add a MAC header to the RLC data blocks to generate RLC/MAC data blocks and transmit these blocks over the physical link (e.g., the wireless antenna 114). It is possible that some or all of the layers may be combined. For example, although the RLC layer and MAC layer are shown as separate layers, they may be combined to form an RLC/MAC layer.

Different categories of processes 105 may prioritize different attributes of network resources based on the nature of the application data requiring transmission. For example, voice conversations are highly sensitive to network delays, but can tolerate some lost information. On the other hand, digital computer data transfers to and from servers (e.g., downloading and interacting with world wide web pages) may be more tolerant of brief transmission delays, but may require that all packets are successfully delivered. These different priorities can be generally characterized as quality of service (QoS) attributes. For example, voice conversations may have QoS attributes reflecting a desire for prompt transmission, but not necessarily guaranteed delivery (e.g., packets that are unsuccessfully transmitted (i.e., dropped) may not be retransmitted or even acknowledged as dropped by the receiving entity). On the other hand, digital computer data transfers to and from servers may have QoS attributes requirements reflecting that the packets may be delayed if necessary, but that any dropped packets should be acknowledged and possibly retransmitted until successfully received. Additional characteristics of processes 105 may suggest other QoS attributes, and relative delay and error tolerances may vary between applications.

To specify each distinct set of QoS attributes required by processes 105, a session management (SM) protocol entity in the MS 102 may request the activation of a packet data protocol context (PDP context) from a peer SM protocol entity in the network controlling the base station 104 wherein each activated PDP Context corresponds to a specific process within the set of processes 105. For example, the MS 102 illustrated in FIG. 1 requires three different QoS settings (one for each process) and will request the activation of three distinct PDP contexts (one for each process). Each PDP context includes specified QoS attributes, as well as a PDP address (often an IP address) that identifies the MS 102. Following PDP context activation, when a specific process within the set of processes 105 executing on the MS 102 needs to transmit application data, the MS 102 will request the establishment of an uplink temporary block flow (TBF) that reflects the QoS attributes of the corresponding PDP context.

Multiple PDP contexts having the same QoS attributes may be grouped (i.e., aggregated) together into a single Packet Flow Context (PFC). The PFC shares the QoS attributes of the aggregated PDP contexts, and each PFC is uniquely identified by a packet flow identity (PFI).

When the MS 102 has application data ready to transmit for a given PFC (e.g., a specific process within the set of processes 105 on the MS 102 has generated one or more IP packets, which are converted to LLC PDUs by the LLC layer 108), it may request the establishment of an uplink temporary block flow (TBF) from the base station in order to transmit the application data. A TBF grants the MS a portion of the time division multiple access (TDMA) resources of the base station. For example, when assigning resources for a TBF the base station may grant an MS 102 access to the fourth TDMA timeslot on a specific frequency. Each TBF is identified by a unique temporary flow identifier (TFI) and supports an RLC entity 111 operating in a mode most appropriate for supporting the QoS attributes of the PFC supported by that TBF. (For example, an RLC entity 111 may operate in an RLC Acknowledged mode wherein dropped RLC data blocks are retransmitted, an RLC Unacknowledged mode wherein dropped RLC data blocks are not retransmitted, or an RLC Non-persistent mode, wherein dropped RLC data blocks may be retransmitted within a certain time interval, after which the dropped RLC data block may be discarded.) Once it has acquired an uplink TBF, the MS may then use the allocated radio resources to transmit the waiting LLC PDU(s) for the corresponding PFC. The LLC layer 108 sends the waiting LLC PDU(s) to the RLC layer 110, at which the appropriate RLC entity 111 divides each LLC PDU into a corresponding set of one or more RLC data blocks. As shown in FIG. 2, in addition to a data payload section 203, each RLC data block includes a TFI field 201 indicating the TFI of the allocated TBF and a block sequence number (BSN) field 202 that sequentially numbers the RLC data blocks being transmitted in a TBF. The TFI is used to uniquely identify the TBF and therefore the corresponding PFC for which application data needs to be transmitted since in legacy systems there is a one to one relationship between a TFI and a PFC. The BSN may be used by the receiving entity to detect any dropped (lost) RLC data blocks. The RLC data blocks are then sent to the MAC/PHY layer(s), where each may be given an additional MAC header with radio access information (e.g., a countdown timer indicating when the MS will no longer require the allocated resources). The RLC/MAC data blocks are then transmitted wirelessly to the base station. When the MS has finished transmitting all of the available application data from the processes 105, it releases the current TBF resources, either immediately or after an extended waiting period. The MS 102 may acquire a new TBF when the MS 102 is ready to transmit one or more additional LLC PDU(s).

Using the above described method for transmitting application data, it may occur that application data corresponding to a PFC with a relatively high transmission priority (e.g., an LLC PDU associated with a PDP context/PFC data having QoS attributes that indicate a low tolerance for delay) becomes ready for transmission while application data corresponding to a PFC with a relatively low transmission priority (e.g., an LLC PDU associated with a PDP context/PFC having QoS attributes that indicate a tolerance for moderate delays) is currently being transmitted. Furthermore, even though they have different transmission priorities, it may occur that both of these PFCs can be supported using an RLC entity operating using the same mode. According to legacy operation, the occurrence of this scenario will be handled by first completing the transmission of the LLC PDU having a relatively low transmission priority using the existing uplink TBF, releasing the uplink TBF and then establishing a new uplink TBF to be used for transmission of the LLC PDU having a relatively high transmission priority. This is problematic as it may result in an unacceptable delay being imposed upon the transmission of the application data associated with the higher priority PFC. It is further assumed that this legacy operation can be enhanced so as to avoid the step of releasing and establishing a new uplink TBF whenever this scenario occurs such that the problematic delay imposed upon the LLC PDU having a relatively high transmission priority will be limited to that of first completing the transmission of LLC PDU having a relatively low transmission priority. Assuming this enhancement to legacy operation is applied and referring now to FIG. 3, FIG. 3 illustrates that a message flow diagram for this case. At a first time, a process associated with a lower priority PFC creates an LLC PDU 301 containing the data "n-o-n-e-s-s-e-n-t-i-a-l". The transmitting RLC entity divides the LLC PDU into several RLC data blocks and begins to transmit these RLC data blocks 302 to the receiving RLC entity (e.g., a base station). At a later time, but before all of the RLC blocks from the first LLC PDU 301 have been transmitted, a second process associated with a higher priority PFC creates an LLC PDU 303 containing the data "u-r-g-e-n-t". However, the RLC entity continues to transmit the RLC data blocks from the low priority LLC PDU 301 until the entire LLC PDU has been transmitted. At this point, the receiving RLC entity reassembles the low priority LLC PDU as LLC PDU 305 and relays it to the appropriate LLC entity such that the application data contained therein can be delivered to the peer process. After the low priority LLC PDU 301 is completely transmitted, the RLC entity may then enable the transmission of the RLC data blocks corresponding to the high priority LLC PDU 303 and begin transmitting those RLC data blocks 306 by continuing to use the same RLC entity on the already established TBF. Finally, when all of the RLC data blocks 306 have been received at the receiving RLC entity, the receiving RLC entity reassembles the RLC data blocks of the high priority LLC PDU as LLC PDU 307 and relays it to the appropriate LLC entity such that the application data contained therein can be delivered to the peer process. As can be seen in FIG. 3, the relatively higher priority application data 303 associated with high priority LLC PDU 303 is undesirably delayed by the ongoing transmission of all of the lower priority application data 301 associated with low priority LLC PDU 301.

SUMMARY

It is the object of the present invention to overcome at least some of the above described disadvantages. Accordingly, in one aspect, the present invention is able to make priority based uplink transmission decisions on the smallest transmission unit possible (i.e. an RLC data block). Consequently, an LLC PDU having a higher priority PFC will never be held hostage to completing the transmission of an LLC PDU associated with a lower priority PFC when both PFCs are supported using the same TBF and the same RLC entity. This will ensure that a mobile station honors the relative transmission priorities to the greatest extent possible when multiple PFCs are assigned to share a common RLC entity. A similar multiplexing scheme can be used by the base station on the downlink when multiple PFCs are assigned to share a common RLC entity.

In one particular aspect, the invention provides a method for transmitting RLC data blocks. In some embodiments, the method may be performed by a GPRS station (e.g., a mobile station (MS) or a base station (BS)) including a logical link control (LLC) layer and a radio link control (RLC) layer with an RLC entity operating in a given mode (e.g., RLC Acknowledged mode, RLC Non-persistent mode or RLC Unacknowledged mode). The method may begin when the RLC entity receives a first LLC protocol data unit (PDU) formed by the LLC layer and corresponding to a first packet flow context (PFC). After receiving the first LLC PDU, the RLC entity begins to transmit the LLC PDU to the receiving station (e.g., a base station). This comprises transmitting one or more RLC data blocks to the receiving station, wherein each of the RLC data blocks comprises a portion of the first LLC PDU.

Before the entirety of the first LLC PDU is transmitted as RLC data blocks, the transmitting RLC entity receives a second LLC PDU from the LLC layer. The second LLC PDU may correspond to a second PFC. When it receives the second LLC PDU, in some embodiments, the transmitting RLC entity may compare the relative transmission priorities of the first and second LLC PDUs (e.g., by comparing the QoS attributes of the associated PDP contexts/PFCs). If the transmitting RLC entity determines that the second LLC PDU has a higher transmission priority than the first LLC PDU, then the RLC entity may begin transmitting RLC data blocks corresponding to the second LLC PDU, even though the first LLC PDU has not been completely transmitted. The transmitting RLC entity may begin transmitting the first RLC data block corresponding to the second LLC PDU upon completing the transmission of the RLC data block in progress (corresponding to the first LLC PDU) or upon aborting the transmission of the RLC data block in progress. After the RLC entity completes transmission of the second LLC PDU as RLC data blocks, it may resume transmitting the first LLC PDU by transmitting any remaining RLC data blocks associated with the first LLC PDU including any RLC data blocks that were aborted immediately prior to beginning the transmission of the first RLC data block corresponding to the second LLC PDU.

Alternatively, if the RLC entity determines that the second LLC PDU has an equivalent transmission priority to the first LLC PDU, then in some embodiments the RLC entity may alternate between servicing each LLC PDU in a "round robin" fashion by transmitting an RLC data block from the second LLC PDU, then transmitting an RLC data block from the first LLC PDU, then transmitting an RLC data block from the second LLC PDU, and so on, alternating between the two LLC PDUs until one has been completely transmitted as RLC data blocks.

In some embodiments, the transmitting station may maintain a single temporary block flow (TBF) that supports all PFCs. In these embodiments, the temporary flow identity (TFI) field of the RLC data blocks may store a TFI value uniquely indicating a corresponding PFC, wherein the TFI field of each RLC data block that contains a portion of the first LLC PDU contains a TFI corresponding to the first PFC, and the TFI field of each RLC data block that contains a portion of the second LLC PDU contains a TFI corresponding to the second PFC.

Furthermore, in some embodiments, the block sequence number (BSN) of each RLC data block maintains a continuous sequence (i.e., if a transmitted RLC data block contains the BSN n, then the next transmitted RLC data block will contain the BSN n+1), independent of whether the successive RLC data blocks contain the same TFI value and therefore independent of whether the successive RLC data blocks belong to the same PFC.

In some embodiments, the above may be achieved using a plurality of transmission queues associated with a single RLC entity operating in a given RLC mode and supported by a single TBF. After each LLC PDU is received by the transmitting RLC entity, the RLC entity may generate the corresponding RLC data blocks, which may be stored in a transmission queue associated with the appropriate PFC and therefore having a common TFI. For example, the RLC data blocks corresponding to the first LLC PDU may be stored in a first transmission queue associated with the first PFC and each will have a common TFI value $TFI_1$, and the RLC data blocks corresponding to the second LLC PDU may be stored in a second transmission queue associated with the second PFC and each will have a common TFI value $TFI_2$. Each of the transmission queues may also be associated with a transmission priority of the corresponding PFC (e.g., based upon the QoS attributes of the associated PFC).

The RLC data blocks stored in the transmission queues may then be selected and transmitted individually, based upon a priority decision for each RLC data block. For example, in some embodiments, transmitting an RLC data block corresponding to the first LLC PDU may include selecting from the first transmission queue an RLC data block, wirelessly transmitting an RLC/MAC data block corresponding to the selected RLC data block, and then removing the selected RLC data block from the transmission queue.

In some embodiments, a transmission queue may be selected based upon its relative transmission priority. For example, in some embodiments a transmission queue associated with a high transmission priority will be selected unless it is empty. In other embodiments, the non-empty transmission queues associated with the highest transmission priority will be selected. In some embodiments, if two or more non-empty transmission queues are tied for the highest transmission priority, they will be alternately selected in a "round robin" fashion.

In another aspect, the invention provides a method for receiving radio link control (RLC) data blocks at a given receiving RLC entity supported by a given TBF and recombining the RLC data blocks into logical link control (LLC) protocol data units (PDUs). In some embodiments, the method may be performed by an RLC entity of a GPRS base station or by a GPRS mobile station (MS). The process may begin when the receiving RLC entity receives one or more RLC data blocks, each of which corresponds to a portion of a first transmitted LLC PDU. These RLC data blocks may belong to a first PFC identified by a first temporary flow identity (TFI) stored in a header each RLC data block. After the RLC entity has received one or more RLC data blocks corresponding to the first transmitted LLC PDU, but before the RLC entity has received all of the RLC data blocks corresponding to the first transmitted LLC PDU, the RLC entity may receive one or more RLC data blocks, each of which corresponds to a portion of a second transmitted LLC PDU. These RLC data blocks may belong to a second PFC identified by a second TFI stored in the header each RLC data block. In some embodiments, when the RLC entity has received all of the RLC data blocks corresponding to the second transmitted LLC PDU, it generates an LLC PDU at the receiving station and relays it to the appropriate LLC entity such that the application data contained therein can be delivered to the peer process. Afterward, the RLC entity may receive additional RLC data blocks corresponding to the first transmitted LLC PDU. In some embodiments, when the RLC entity has received all of the RLC data blocks corresponding to the first transmitted LLC PDU, it generates an LLC PDU at the receiving station and relays it to the appropriate LLC entity such that the application data contained therein can be delivered to the peer process.

In another aspect, the invention provides a wireless communication apparatus. In some embodiments, the wireless communication apparatus includes a protocol stack comprising an LLC layer and a RLC layer including at least one RLC entity. The RLC entity may be operable to receive a first LLC PDU formed by the LLC layer and corresponding to a first PFC and form a first set of RLC data blocks corresponding to the first LLC PDU. The RLC entity may be further operable to transmit a subset of the first set of RLC data blocks formed by the RLC entity, wherein each transmitted RLC data block in the first set of RLC data blocks comprises at least a portion of the first LLC PDU, which portion has not previously been transmitted in an RLC data block. The RLC entity may be further operable to receive a second LLC PDU formed by the LLC layer and corresponding to a second PFC after receiving the first LLC PDU, and form a second set of RLC data blocks corresponding to the second LLC PDU. The RLC entity may be operable to transmit all of the second set of RLC data blocks formed by the RLC entity after transmitting the subset of the first set of RLC data blocks, wherein each transmitted RLC data block in the second set of RLC data blocks comprises at least a portion of the second LLC PDU, which portion has not previously been transmitted in an RLC data block. In addition, the RLC entity may be operable to transmit the remainder of the first set of RLC data blocks formed by the RLC entity but not yet transmitted, after transmitting the second set of RLC data blocks, wherein each transmitted RLC data block in the remainder of the first set of RLC data blocks comprises at least a portion of the first LLC PDU, which portion has not previously been transmitted in an RLC data block.

In another aspect, the invention provides another wireless communication apparatus. In some embodiments, the wireless communication apparatus includes a protocol stack comprising a LLC layer and a RLC layer including a transmitting RLC entity supported on a given TBF. The RLC entity may be operable to receive a first LLC PDU formed by the LLC layer and corresponding to a first PFC and form a first set of RLC data blocks corresponding to the first LLC PDU. The RLC entity may be further operable to transmit a subset of the first set of RLC data blocks formed by the RLC entity, wherein each transmitted RLC data block in the first set of RLC data blocks comprises at least a portion of the first LLC PDU, which portion has not previously been transmitted in an RLC data block. The RLC entity may be further operable to receive at the RLC entity a second LLC PDU formed by the LLC layer and corresponding to a second PFC after receiving the first LLC PDU, and form a second set of RLC data blocks corresponding to the second LLC PDU. The RLC entity may be further operable to, after transmitting a subset of the first set of RLC data blocks, transmit an RLC data block in the second set of RLC data blocks formed by the RLC entity, the transmitted RLC data block comprises at least a portion of the second LLC PDU, which portion has not previously been transmitted in an RLC data block. The RLC entity may be further operable to, after transmitting the RLC data block that comprises a portion of the second LLC PDU, transmit an RLC data block formed by the RLC entity, the transmitted RLC data block comprises at least a portion of the first LLC PDU, which portion has not previously been transmitted in an RLC data block. The RLC entity may be further operable to alternate between the transmission of one RLC data block belonging to the first set of RLC data blocks and one RLC data block belonging to the second set of RLC data blocks until completing the transmission of all RLC data blocks for either the first or second LLC PDU.

In another aspect, the invention provides another wireless communication apparatus. In some embodiments, the wireless communication apparatus includes a receiving RLC entity supported by a given TBF. The RLC entity is operable to receive a first set of one or more RLC data blocks from its peer RLC entity (i.e. the transmitting RLC entity), each RLC data block included in the first set corresponding to a portion of a first transmitted LLC PDU and having a first unique TFI value. The RLC entity may be further operable to, after receiving the first set of RLC data blocks, receive a second set of one or more RLC data blocks, each RLC data block included in the second set corresponding to a portion of a second transmitted LLC PDU and having a second unique TFI value. The RLC entity may be further operable to form a first received LLC PDU corresponding to the second transmitted LLC PDU and relaying the first received LLC PDU to an LLC layer for processing. The RLC entity may be further operable to, after receiving the second set of RLC data blocks, receive a third set of one or more RLC data blocks, each RLC data block included in the third set corresponding to a portion of the first transmitted LLC PDU and having the first unique TFI value. The RLC entity may be further operable to form a second received LLC PDU corresponding to the first transmitted LLC PDU and relaying the second received LLC PDU to the LLC layer for processing.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
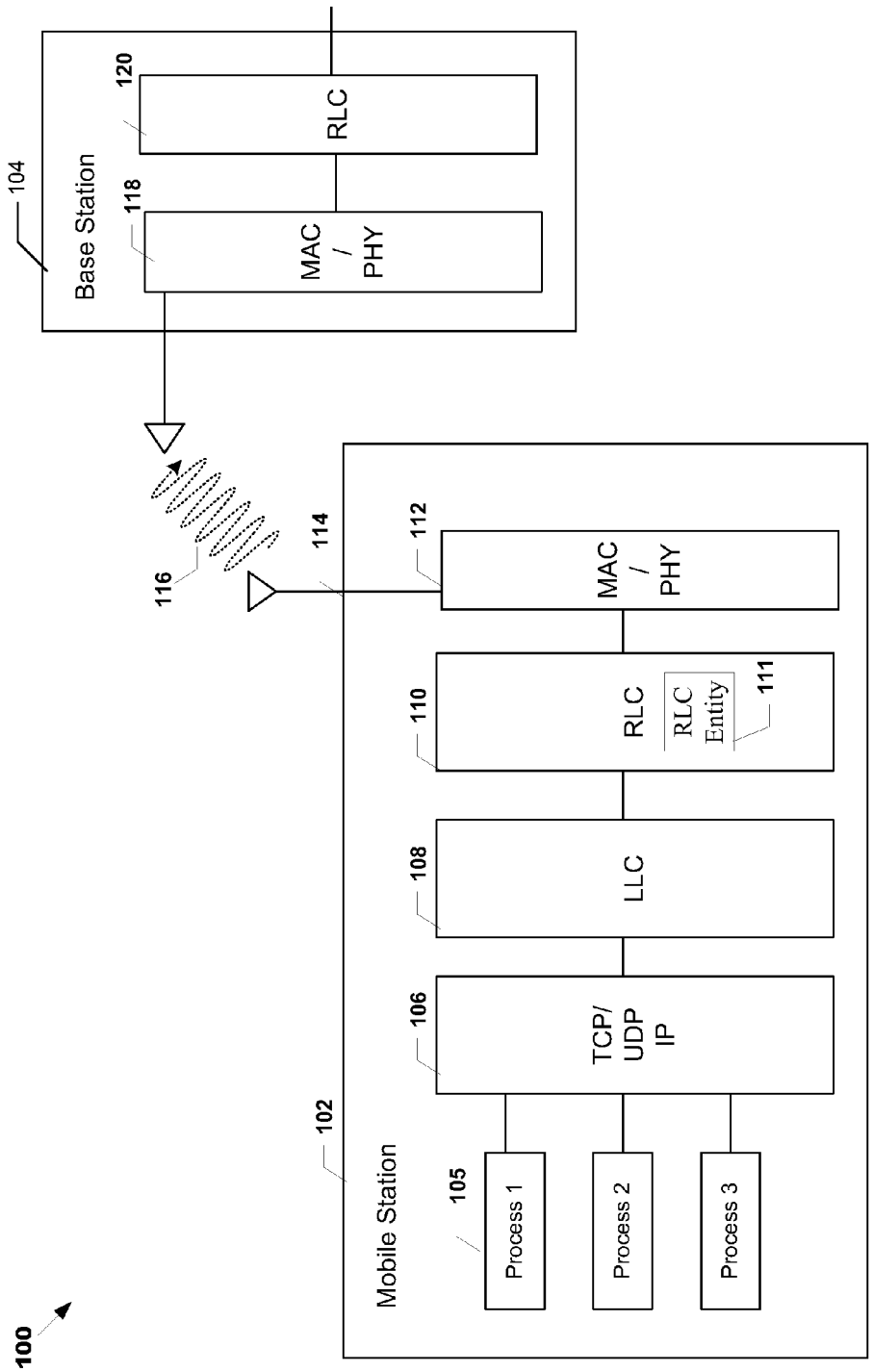
FIG. 1 illustrates a MS in communication with a base station.
Figure 2:
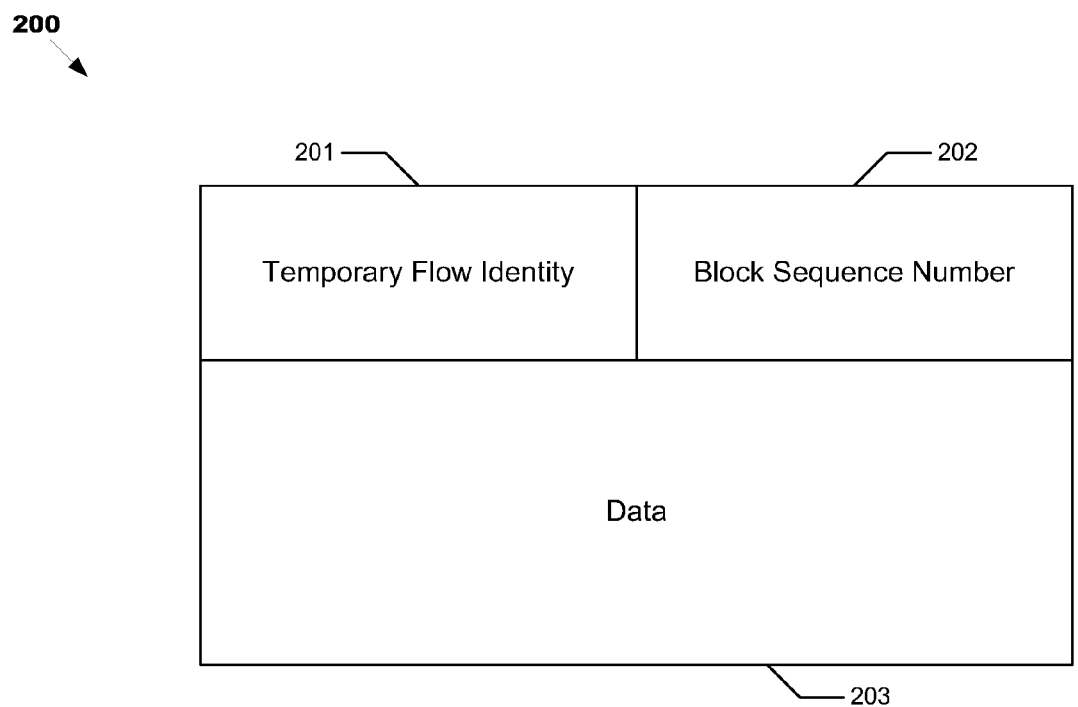
FIG. 2 illustrates an RLC data block.
Figure 3:
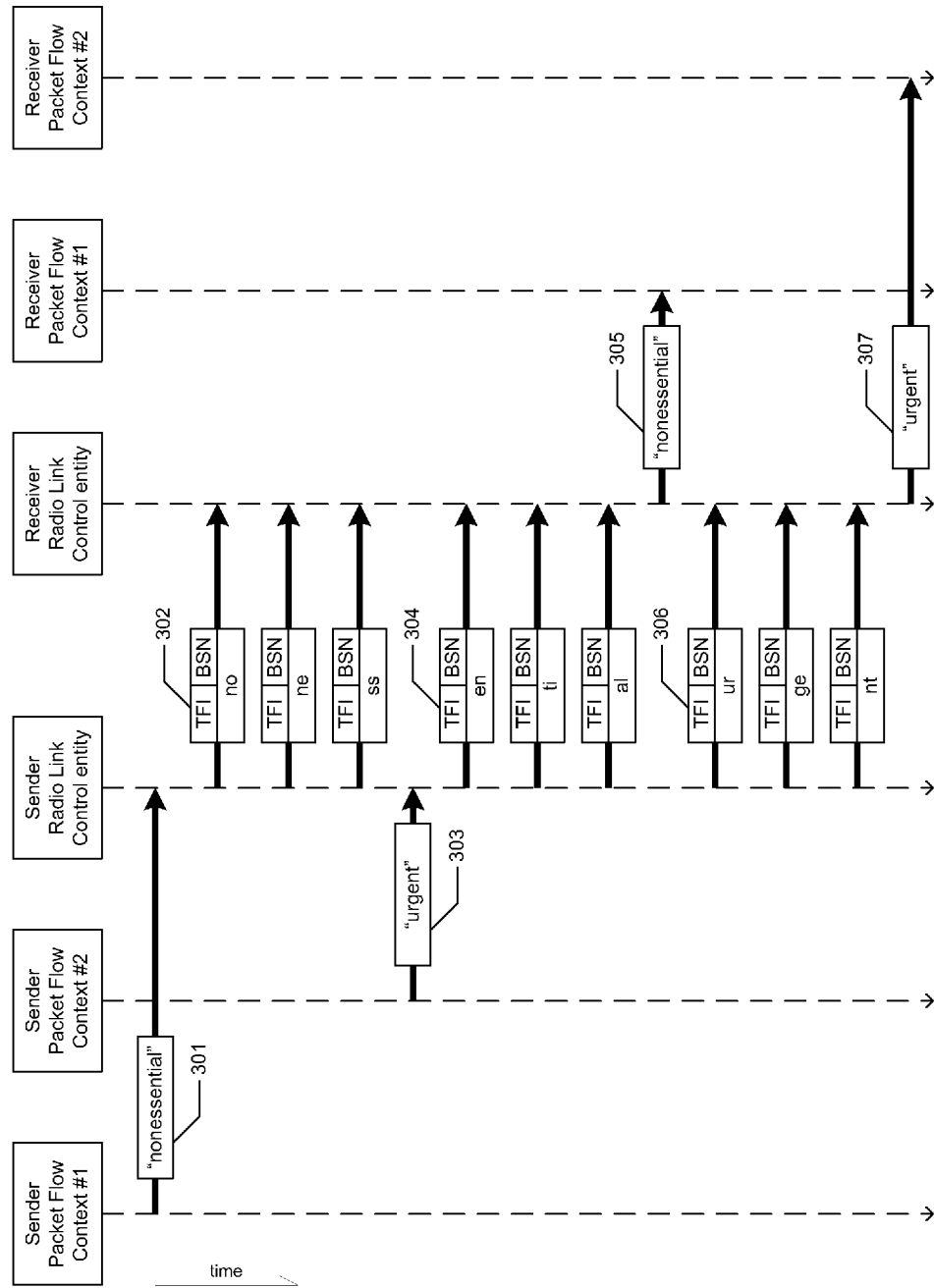
FIG. 3 is a message timing diagram for two LLC PDUs having different priorities according to the prior art.

Referring to FIG. 1, FIG. 1 illustrates a mobile station (MS) 102 and a base station 104 according to one aspect of the invention. As illustrated in FIG. 1, an MS 102 may include one or more processes 105 (e.g., a voice call process, a web browser, and a text messaging client) that send and receive application data to other devices attached to an external network (e.g., the Internet) via wireless communication 116 with a base station 104. As shown in FIG. 1, the MS 102 may include a multi-level GPRS protocol stack for converting PDUs created by the processes 105 to PDUs suitable for wireless transmission over a GPRS network. The GPRS protocol stack in the MS 102 will usually include transport/network layers 106 (e.g., TCP/IP, UDP/IP, etc.), a logical link control (LLC) layer 108, a radio link control (RLC) layer 110 including at least one RLC engine 111 (i.e., RLC entity) for performing the functions of the RLC layer, and a media access control (MAC)/physical (PHY) layer 112. The base station 104 may also include its own protocol stack (e.g., a MAC/PHY layer 118, an RLC layer 120 including a peer RLC entity corresponding to the RLC entity 111 in the MS, etc.) for receiving the MAC/RLC data blocks from the MS 102 and reconstructing LLC PDUs from received RLC data blocks. Those LLC PDUs may then be transmitted to other nodes in the network where they are transformed into network PDUs (e.g., IP packets) and be transmitted to devices connected to a remote network (e.g., the Internet).

Figure 4:
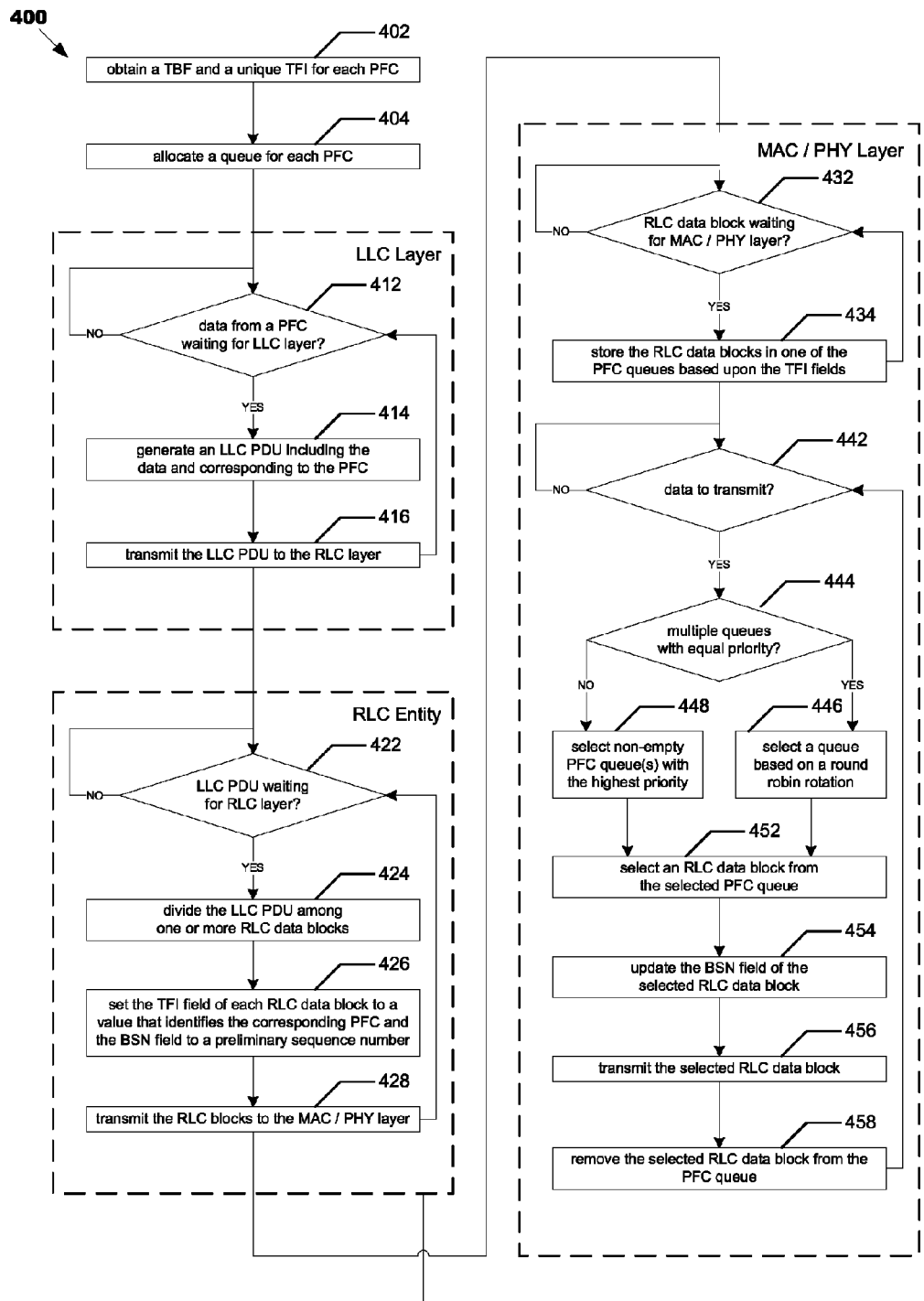
FIG. 4 is a data flow diagram illustrating a process for transmitting RCL data blocks based upon relative priorities.
Figure 5:
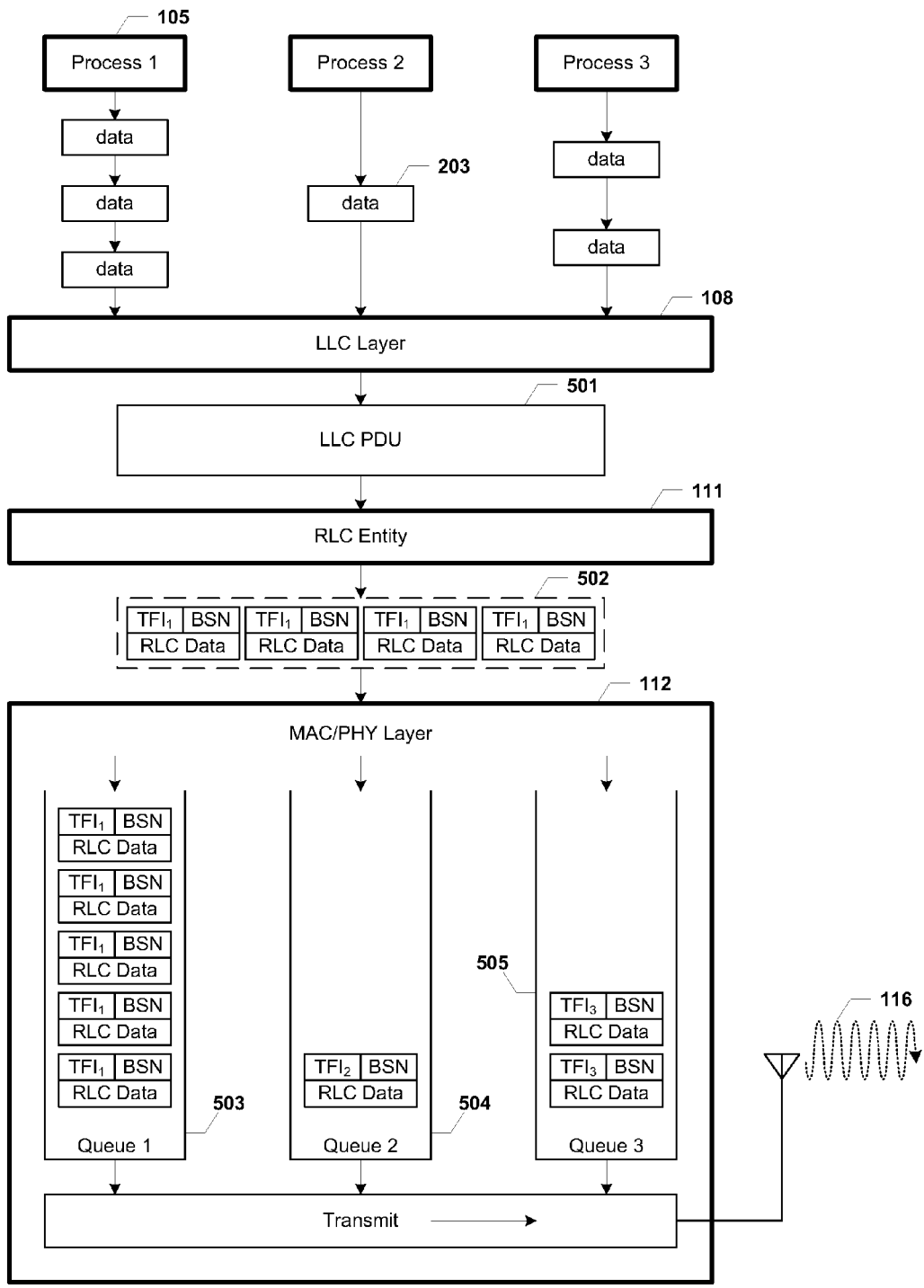
FIG. 5 is a flow chart illustrating a process for transmitting RCL data blocks based upon relative priorities.

Referring now to FIG. 4, FIG. 4 illustrates a process 400 for transmitting GPRS data blocks according to priority information (see FIG. 5, which illustrates a data flow diagram for the process 400 and further illustrates the MAC/PHY layer). The process 400 will herein be disclosed as being performed by the MS 102. However, the invention is not so limited and may be performed, for example, by the base station 104 when transmitting application data to a MS 102.

The process 400 may begin at step 402, where the MS 102 obtains a temporary block flow (TBF) and temporary flow identity (TFI) for each packet flow context (PFC) that corresponds to a packet data protocol context (PDP context) of the MS 102. For example, in FIG. 5, three processes are illustrated, each of which may each have its own PDP context associated with a distinct PFC (i.e. each has its own unique PFI). Accordingly, at step 402 the MS 102 may obtain an uplink TBF, an indication of what type of RLC entity to use on the uplink TBF and a unique TFI corresponding to each PFC supported by the uplink TBF, from the base station 104.

At step 404, the MS 102 allocates a transmission queue for storing RLC data blocks corresponding to each PFC. For example, as shown in FIG. 5, the MS 102 may allocate three transmission queues in 112, each corresponding to a distinct PFC used by the MS 102. In other embodiments, the number of transmission queues may vary as necessary to accommodate the number of PFCs.

As shown in FIG. 4, in some embodiments the following steps 412 through 416 may be performed by an LLC layer 108 of the MS 102. At step 412, the LLC layer 108 determines whether any application data has been generated by the processes 105 (e.g., IP packets) for transmission. In the case that no application data is available, the LLC layer 108 may wait at step 412. In the case that data is available, at step 414 the LLC layer 108 generates an LLC PDU 501 including the application data. For example, in some embodiments the LLC layer 108 may append an LLC header to an IP packet generated by an executing process 105. The MS 102 also maintains an association between the generated LLC PDU 501 and the PFC associated with the process 105 that generated the application data. At step 416, the LLC layer 108 transmits the generated LLC PDU 501 to the appropriate RLC entity 111 (e.g., the LLC layer 108 may place the generated LLC PDU 501 in an RLC layer queue). After the LLC PDU 501 is generated and provided to the RLC layer, the LLC layer 108 returns to step 412 to process any additional data generated by a process 105.

As shown in FIG. 4, in some embodiments the following steps 422 through 428 may be performed by an RLC entity 111 of the MS 102. At step 422, the RLC entity 111 determines whether any LLC PDUs 501 are waiting for transmission. In the case that no LLC PDUs 501 are ready, the RLC entity 111 may wait at step 422. In the case that an LLC PDU 501 is ready, at step 424 the RLC entity generates one or more RLC data blocks 502. Each RLC data block 502 contains a portion of the LLC PDU 501, as well an RLC header including a block sequence number (BSN) field and a TFI field. At step 426, the RLC entity 111 sets the TFI field of each of the RLC data blocks 502 to the value that designates the PFC associated with the LLC PDU 501. The BSN field of each RLC data block is set to a preliminary sequence number, which reflects the sequence position of each RLC data block with regard to that PFC. At step 426, the RLC entity 111 provides the generated RLC data blocks 502 to the MAC/PHY layer 112. For example, the generated RLC data blocks may be placed in a queue 503, where the data blocks will wait to be processed by the MAC/PHY later. After the RLC data blocks 502 are generated and provided to the lower layer, the RLC entity 111 may return to step 422 to process any additional LLC PDUs 501.

As shown in FIG. 4, in some embodiments the following steps 432 through 458 may be performed by the MAC/PHY layer 112 of the MS 102. At step 432, the MAC/PHY layer 112 determines whether any new RLC data blocks 502 have been produced by the RLC entity 111. In the case that no new RLC data blocks 502 are ready, the MAC/PHY layer may wait at step 432. In the case that RLC data blocks 502 are ready, at step 434 the MAC/PHY layer 112 will store the RLC data blocks 502 in an appropriate transmission queue 503, 504, 505 corresponding to the PFC indicated by the TFI stored in the RLC data blocks 502 (in an alternative embodiment, the RLC entity 111 may place the RLC data blocks in the appropriate queue based on the PFC). For example, as illustrated in FIG. 5, RLC data blocks indicating $TFI_1$ are stored in a first transmission queue 503 (Queue 1), RLC data blocks indicating $TFI_2$ are stored in a second transmission queue 504 (Queue 2), and data blocks indicating $TFI_3$ are stored in a third transmission queue 505 (Queue 3). After the RLC data blocks 502 are stored in the appropriate transmission queue, the MAC/PHY layer 112 may return to step 432 and monitor for any new RLC data blocks.

As the MAC/PHY layer 112 or RLC entity 111 is storing the RLC data blocks 502 in transmission queues 503, 504, 505, the MAC/PHY layer 112 may also be transmitting RLC data blocks over the wireless interface 116 to the base station 104. At step 442, the MAC/PHY layer 112 checks whether any of the transmission queues 503, 504 and 505 have RLC data blocks to transmit. In the case that all of the transmission queues are empty, the MAC/PHY layer 112 may wait at step 442. In the case that at least one of the transmission queues is not empty, at step 444 the MAC/PHY layer 112 checks the transmission priority of each non-empty transmission queue to determine the non-empty transmission queue with the highest priority. This may comprise examining the quality of service (QoS) attributes of the PFC associated with each non-empty transmission queue. If there are two or more non-empty transmission queues that are tied for the highest transmission priority, at step 446 the MAC/PHY layer 112 selects one of these transmission queues based upon a "round robin" rotation scheme. If there is only one non-empty transmission queue with a uniquely high priority, then at step 448 the MAC/PHY layer 112 selects that transmission queue.

For example, if three non-empty transmission queues 503, 504 and 505 (e.g., Queue 1, Queue 2, and Queue 3) have distinct relative priority levels (low, high, and medium, respectively), then at step 448 the MAC/PHY layer 112 selects the transmission queue with the highest transmission priority (e.g., Queue 2). On the other hand, if three non-empty transmission queues included non-distinct relative priorities (e.g., low, high, and high, respectively), then at a first occurrence of step 446 the MAC/PHY layer 112 would select one of the queues with the highest relative propriety (e.g., Queue 2), at the next occurrence of step 446 the MAC/PHY layer 112 would select another of the queues with the highest relative propriety (e.g., Queue 3), and on subsequent occurrences of step 446 the MAD/PHY layer 112 may continue to alternate between the transmission queues with the highest relative priority (e.g., Queue 2 and Queue 3), to ensure that application data from neither of the corresponding PFCs is waiting for the other to be completely transmitted.

At step 452, the MAC/PHY layer 112 selects an RLC data block from the selected queue. At step 454, the MAC/PHY layer 112 updates the preliminary BSN of the selected RLC data block to the actual BSN that corresponds to the relative position of the RLC data block in the contiguous sequence of RLC data blocks transmitted by the MAC/PHY layer 112. Thus the RLC data blocks transmitted by the MAC/PHY layer will exhibit sequentially numbered BSNs, regardless of which PFC is associated with each RLC data block. The MAC/PHY layer 112 may also add a MAC header to the RLC data block to generate a MAC/RLC data block, and at step 456 the MAC/PHY layer 112 wirelessly transmits the MAC/RLC data block to the base station 104. After the MAC/RLC data block has been transmitted, at step 458 the MAC/PHY layer may remove the transmitted RLC data block from its corresponding transmission queue, and then may return to step 442 for selecting and transmitting the next RLC data block. Alternatively, if the mode of operation of the RLC entity allows for retransmission of RLC data blocks (e.g. RLC Acknowledged mode), a transmitted RLC data block may continue to be buffered at the MAC/PHY layer until the peer RLC entity confirms its reception.

According to the above method, transmission priority decisions may be made at the RLC data block granularity. This ensures that once RLC data blocks comprising an LLC PDU having a relatively high transmission priority are ready for transmission (i.e., the RLC data blocks are stored in one of the transmission queues), they will not be delayed by waiting for a lower priority LLC PDU to finish transmitting.

FIGS. 4 and 5 illustrate an embodiment of the invention wherein the queuing and selection of RLC data blocks occurs in the MAC/PHY layer 112, that is, the RLC entity 111 creates RLC data blocks 502 from an LLC PDU 501 and transmits the RLC data blocks 502 to the MAC/PHY layer 112 without substantial delay. In another embodiment, the queuing and selection of RLC data blocks 502 may occur within the RLC entity 111.

Figure 6:
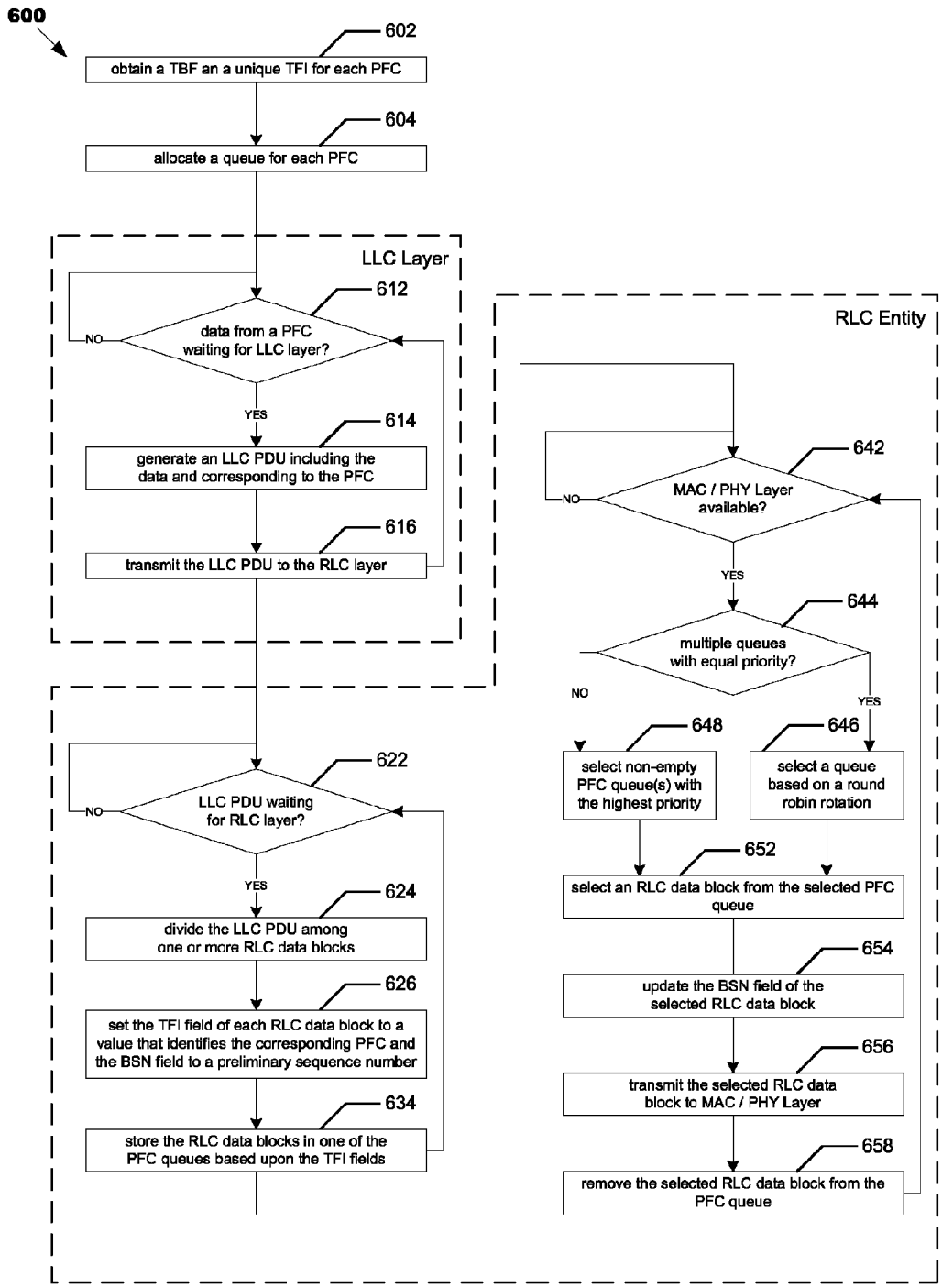
FIG. 6 is a data flow diagram illustrating a process for transmitting RCL data blocks based upon relative priorities
Figure 7:
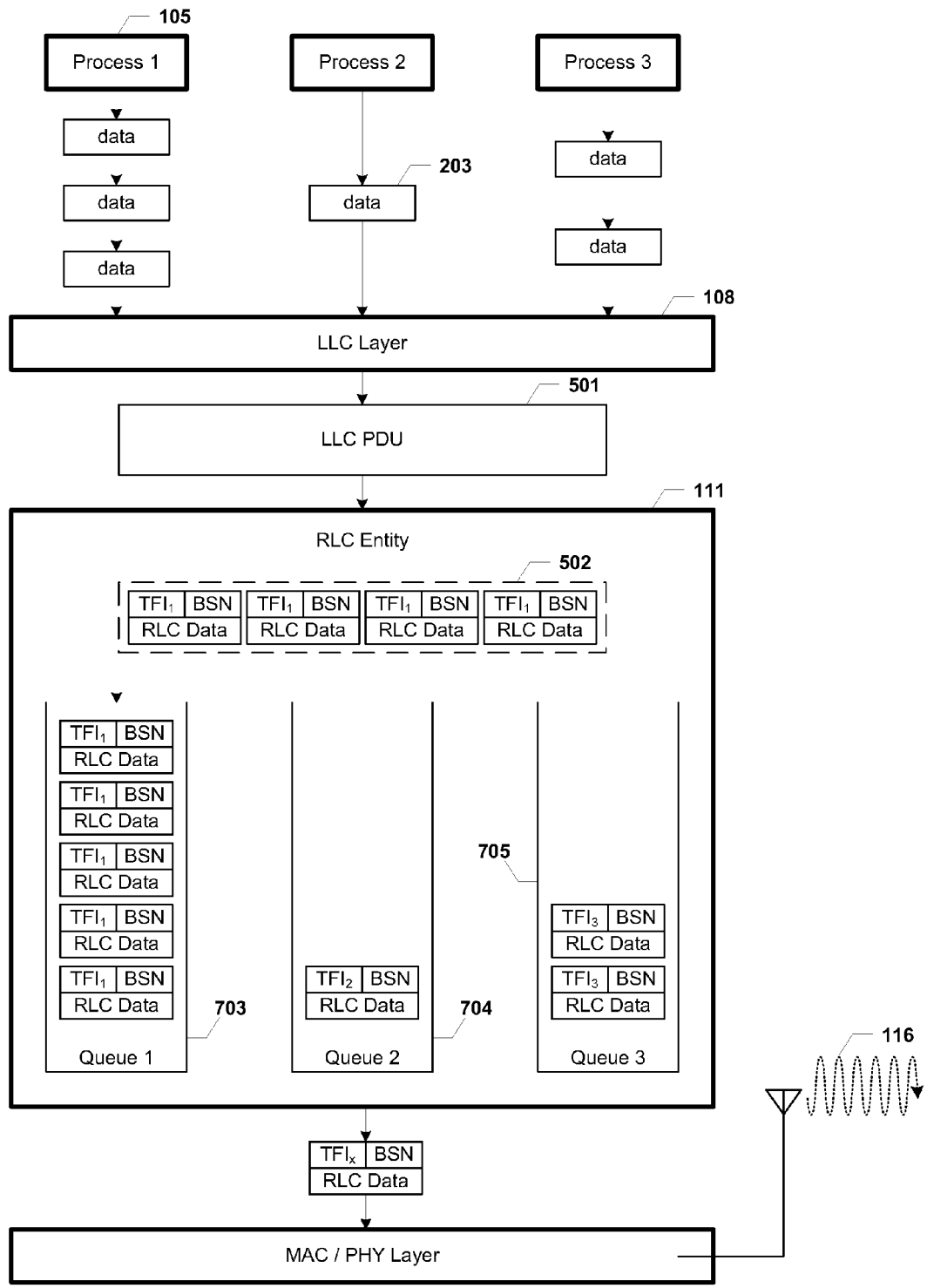
FIG. 7 is a flow chart illustrating a process for transmitting RCL data blocks based upon relative priorities.

Referring now to FIG. 6, FIG. 6 illustrates a process 600 for transmitting GPRS data blocks according to priority information (see FIG. 7, which illustrates a data flow diagram for the process 600). The process 600 will herein be disclosed as being performed by the MS 102. However, the invention is not so limited and may be performed, for example, by the base station 104 when transmitting data to a MS 102.

The process 600 may begin at step 602, where the MS 102 obtains an uplink temporary block flow (TBF), an indication of what type of RLC entity to use on the uplink TBF and a unique temporary flow identity (TFI) corresponding to each PFC supported by the uplink TBF, from the base station 104. Alternatively step 602 and 604 may be performed at any point after application data has been generated by any of the processes 105.

At step 604, the MS 102 allocates a transmission queue for storing RLC data blocks corresponding to each PFC.

As shown in FIG. 6, in some embodiments the following steps 612 through 616 may be performed by an LLC layer 108 of the MS 102. At step 612, the LLC layer 108 determines whether any application data has been generated by the processes 105 (e.g., IP packets) for transmission. In the case that no application data is available, the LLC layer 108 may wait at step 612. In the case that application data is available, at step 614 the LLC layer 108 generates an LLC PDU 501 including the application data. For example, in some embodiments the LLC layer 108 may append an LLC header to an IP packet generated by an executing process 105. The MS 102 also maintains an association between the generated LLC PDU 501 and the PFC associated with the process 105 that generated the application data. At step 616, the LLC layer 108 sends the generated LLC PDU 501 to the appropriate RLC entity 111. After the LLC PDU 501 is generated and sent, the LLC layer 108 returns to step 612 to process any additional application data generated by the processes 105.

As shown in FIG. 6, in some embodiments the following steps 622 through 658 may be performed by an RLC entity 111 of the MS 102. At step 622, the RLC entity 111 determines whether any LLC PDUs 501 are waiting for transmission. In the case that no LLC PDUs 501 are ready, the RLC entity 111 may wait at step 622. In the case that an LLC PDU 501 is ready, at step 624 the RLC entity generates one or more RLC data blocks 502. Each RLC data block 502 contains a portion of the LLC PDU 501, as well an RLC header including a block sequence number (BSN) field and a TFI field. At step 626, the RLC entity 111 sets the TFI field of each of the RLC data blocks 502 to the value that corresponds to the PFC associated with the LLC PDU 501. The BSN field of each RLC data block is set to a preliminary sequence number, which reflects the sequence position of each RLC data block with regard to that PFC.

At step 634 the RLC entity 111 will store the RLC data blocks 502 in an appropriate transmission queue 703 corresponding to the PFC indicated by the TFI stored in the RLC data blocks 502. After the RLC data blocks 502 are stored in the appropriate transmission queue 703, the RLC entity 111 may return to step 622 to process any additional LLC PDUs 501.

As the RLC entity 111 is storing the RLC data blocks 502 in an appropriate transmission queue 703, 704, 705, it may also, in parallel, be transmitting RLC data blocks to the MAC/PHY layer 112 as resources become available. Accordingly, at step 642, the RLC entity 111 checks whether the MAC/PHY layer 112 is ready to transmit an RLC data block. In the case that the MAC/PHY layer 112 is unavailable (e.g., if it is currently transmitting or receiving other data), the RLC entity 111 may wait at step 642. In the case that the MAC/PHY layer 112 is ready to transmit an RLC data block, at step 644 the RLC entity 111 checks the transmission priority of each non-empty transmission queue to determine the non-empty transmission queue with the highest priority. If there are two or more non-empty transmission queues that are tied for the highest transmission priority, at step 646 the RLC entity 111 selects one of these transmission queues based upon a "round robin" rotation scheme. If there is only one non-empty transmission queue with a uniquely high priority, then at step 648 the RLC entity selects that transmission queue.

At step 652, the RLC entity 111 selects an RLC data block from the selected queue. At step 654, the RLC entity 111 updates the preliminary BSN of the selected RLC data block to the actual BSN that corresponds to the relative position of the RLC data block in the contiguous sequence of RLC data blocks transmitted by the RLC entity 111. Thus the RLC data blocks sent by the RLC entity will exhibit sequentially numbered BSNs, regardless of which PFC is associated with each RLC data block. At step 656 the RLC entity 111 sends the RLC data block to the MAC/PHY layer 112 for wireless transmission to the base station 104. After the RLC data block has been sent, at step 658 the RLC entity 111 may remove that RLC data block from its corresponding transmission queue, and then may return to step 642 for selecting and transmitting the next RLC data block. Alternatively, if the mode of operation of the RLC entity allows for retransmission of an RLC data block (e.g. RLC Acknowledged mode), an RLC data block sent to the MAC/PHY layer may continue to be buffered at the RLC layer until the peer RLC entity confirms its reception.

Figure 8:
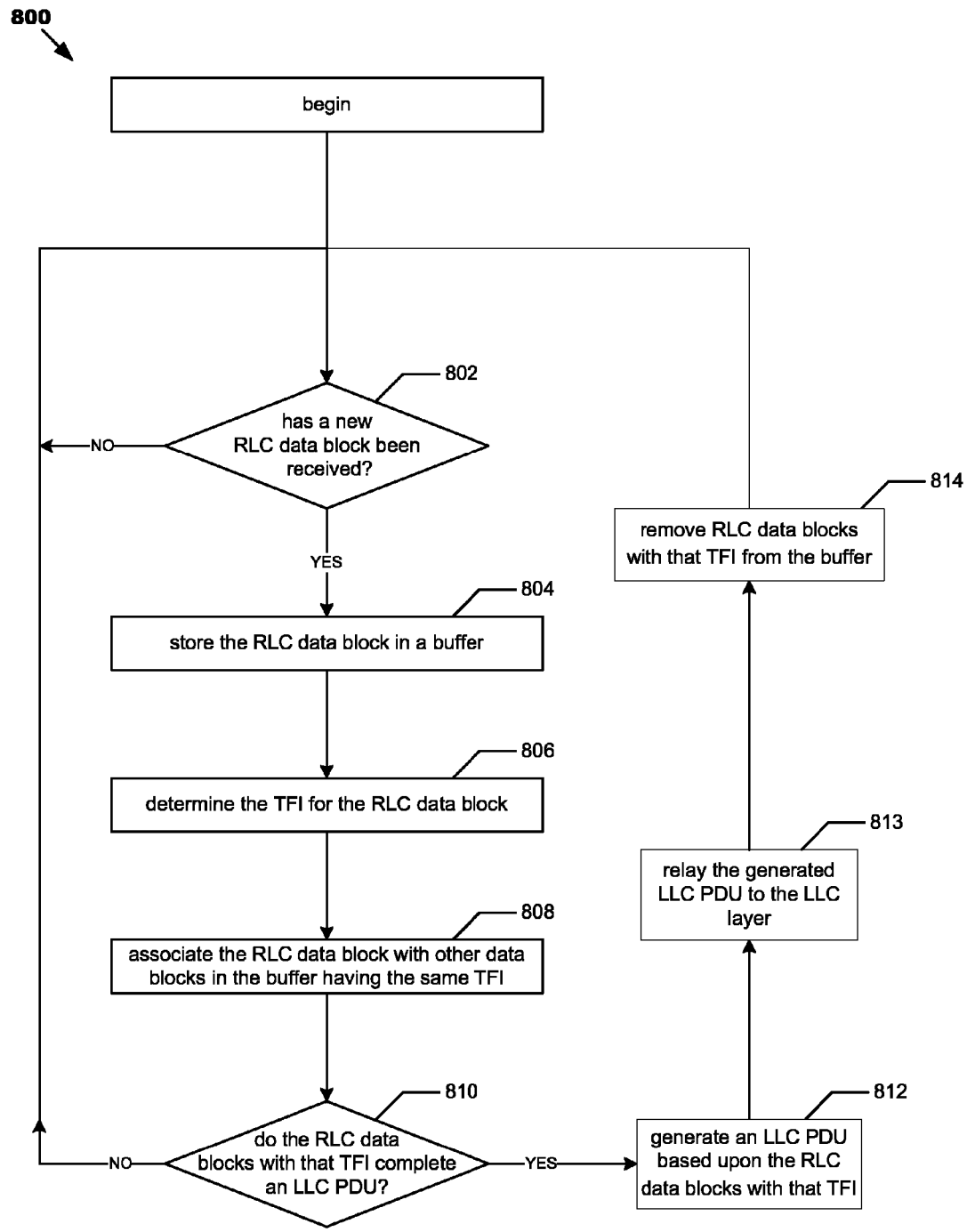
FIG. 8 is a flow chart illustrating a process for assembling LLC PDUs from interleaved RLC data blocks.

Referring now to FIG. 8, FIG. 8 illustrates a process 800 for re-assembling LLC PDUs from received RLC data blocks whereby a contiguous sequence of RLC data blocks as determined by BSN may include RLC data blocks having different TFI values. The process 800 may be performed, for example, by a receiving RLC entity in a base station 104, or an RLC entity 111 in a MS 102.

At step 802, the receiving RLC entity determines whether any new RLC data blocks have been received. In the case that no new RLC data blocks have been received, the receiving RLC entity may wait at step 802. In the case that a new RLC data block has been received, at step 804 the receiving RLC entity stores the RLC data block in a buffer.

At step 806, the receiving RLC entity checks the TFI field of the received RLC data block to determine the corresponding TBF, and the corresponding PFC. At step 808, the receiving RLC entity groups the received RLC data block with any other previously received RLC data blocks in the buffer that have the same TFI.

At step 810, the receiving RLC entity determines whether the received RLC data blocks stored in the buffer which share that TFI comprise an entire LLC PDU. In the case that the RLC data blocks with that TFI do not yet comprise an entire LLC PDU, the receiving RLC entity returns to step 802 waiting for additional RLC data blocks.

In the case that the RLC data blocks with that TFI do comprise an entire LLC PDU, at step 812 the receiving RLC entity reassembles the RLC data blocks to generate an LLC PDU which is then relayed to the LLC layer at step 813. At step 814, the receiving RLC entity removes the RLC data blocks from the queue that were used to generate the new LLC PDU and may return to step 802 to wait for new RLC data blocks.

Additionally, after generating the LLC PDU the receiving RLC entity relays the new LLC PDU to the LLC layer. In this way, the receiving RLC entity can receive the RLC data blocks for two or more LLC PDUs interleaved and still reassemble the appropriate LLC PDUs based on the TFI values in the RLC data blocks.

Figure 9:
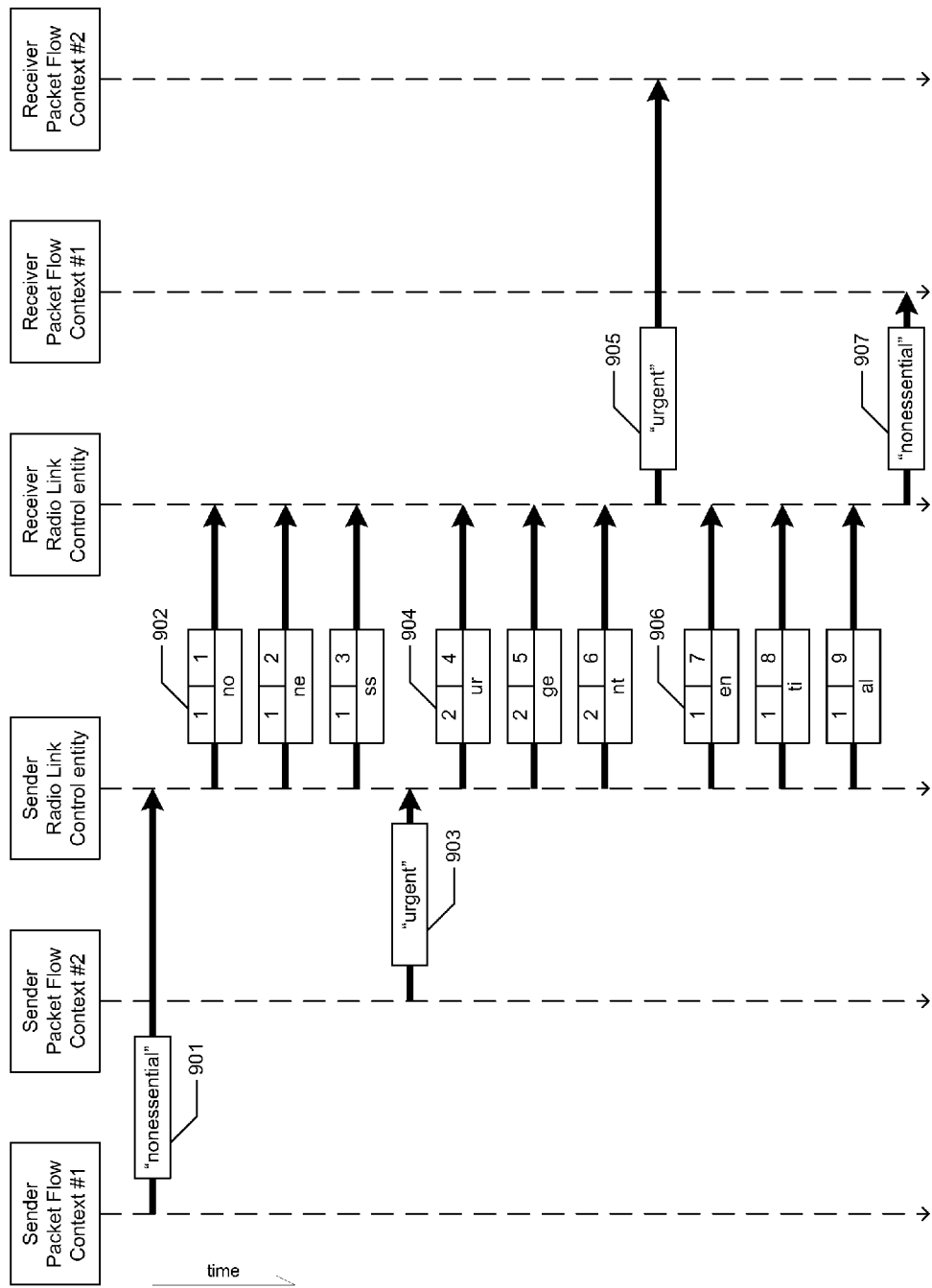
FIG. 9 is a message timing diagram for two LLC PDUs having different priorities according to some embodiments of the invention.

Using the above described methods for transmitting application data, a situation where relatively higher priority application data is undesirably delayed by the concurrent transmission of the lower priority application data may be avoided. Referring now to FIG. 9, FIG. 9 illustrates a message flow diagram in this case. At a first time, a process associated with a lower priority PFC creates an LLC PDU 901 containing the application data "n-o-n-e-s-s-e-n-t-i-a-l". The transmitting RLC entity divides the LLC PDU into several RLC data blocks and places the RLC data blocks into a relatively low priority transmission queue. Because no other transmission queues have application data to transmit, the RLC entity begins to transmit the low priority RLC data blocks 902 to the receiving RLC entity (e.g., an RLC entity in a base station). At a later time, but before all of the RLC blocks from the first LLC PDU have been transmitted, a second process associated with a higher priority PFC creates an LLC PDU 903 containing the application data "u-r-g-e-n-t". The transmitting RLC entity divides the LLC PDU into several RLC data blocks and places the RLC data blocks into a relatively high priority transmission queue. When the RLC entity is ready to transmit the next RLC data block, it selects an RLC data block from the non-empty, high priority transmission queue. The RLC entity continues to transmit the RLC data blocks 904 from the high priority LLC PDU 903 until the entire LLC PDU has been transmitted. At this point, the receiving RLC entity reassembles the high priority LLC PDU as LLC PDU 905 and processes it according to the appropriate PFC. After the high priority LLC PDU 903 is completely transmitted, when the RLC entity is ready to transmit the next RLC data block, it selects an RLC data block from the low priority transmission queue, as the high priority transmission queue is now empty. The RLC entity may transmit the remaining RLC data blocks 906 corresponding to the low priority LLC PDU 901. When all of the RLC data blocks 902 and 906 have been received at the receiving RLC entity, the receiving RLC entity reassembles the RLC data blocks into the low priority LLC PDU and processes that LLC PDU according to the appropriate PFC. As can be seen in FIG. 9, the relatively higher priority application data 903 is not significantly delayed by the transmission of the lower priority application data 901.

Figure 10:
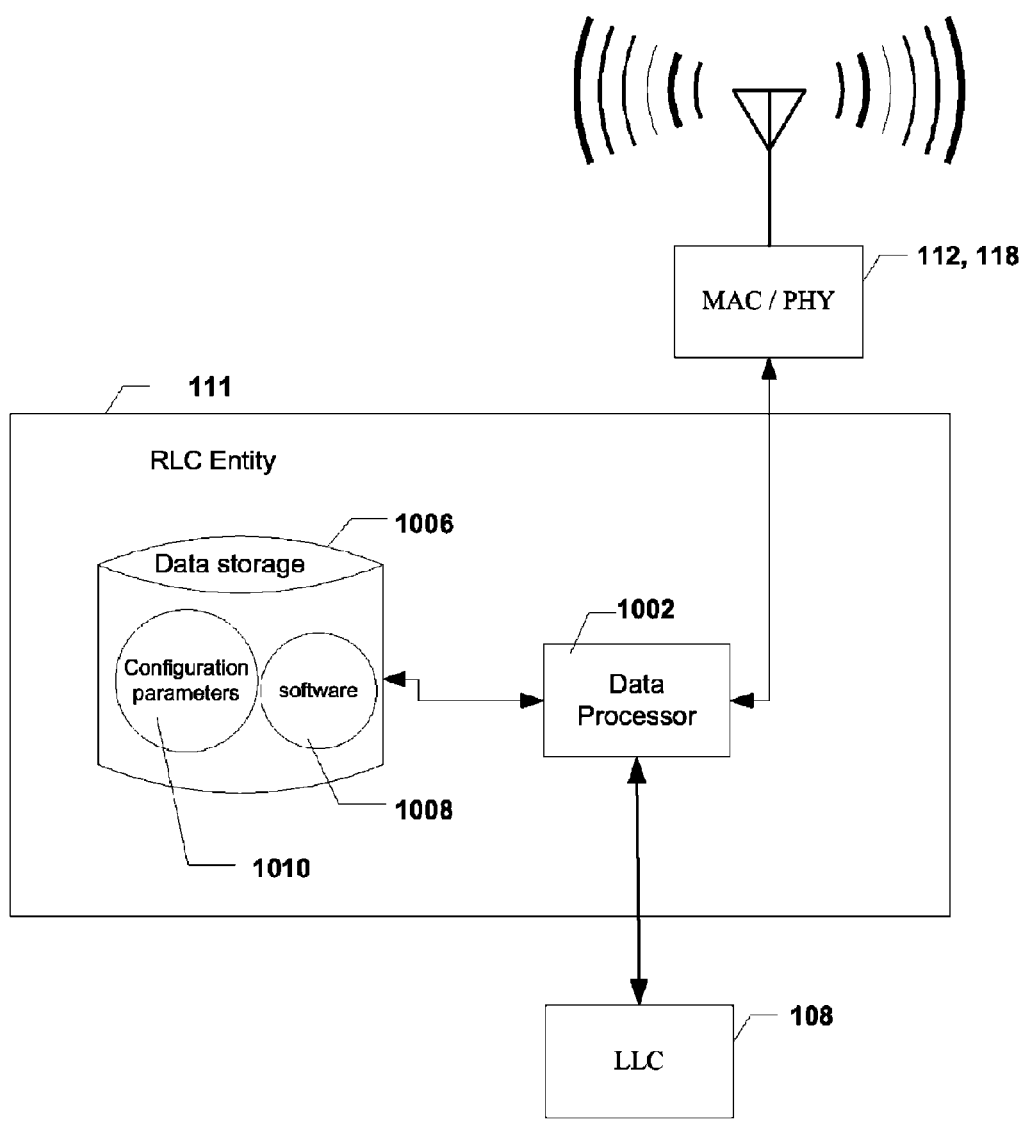
FIG. 10 is a block diagram of an RLC entity.

Referring now to FIG. 10, FIG. 10 is a functional block diagram of RLC entity 111 according to some embodiments of the invention. Although RLC entity 111 is shown as a component of the RLC layer in MS 102, the RLC entity 111 may also be a component of the RLC layer 120 in base station 104. As shown in FIG. 10, RLC entity 111 may comprise a data processing system 1002 (e.g., one or more microprocessors, one or more integrated circuits, such as an application specific integrated circuit (ASIC), Field-programmable gate arrays (FPGAs), etc. and any combination of these), a data storage system 1006 (e.g., one or more non-volatile storage devices) and computer software 1008 stored on the storage system 1006. Configuration parameters 1010 may also be stored in storage system 1006. The RLC entity 111 can communicate with an LLC layer 108 for exchanging application data with processes 105, and with a MAC/PHY layer 112, 118 for transmitting application data to and receiving application data from other wireless stations. The software 1008 is configured such that when the processor 1002 executes the software 1008, the RLC entity 111 performs steps described above (e.g., steps describe above with reference to the flow charts). For example, software 1008 may include: (1) computer instructions for receiving a first LLC PDU corresponding to a first PFC and forming a first set of RLC data blocks corresponding to the first LLC PDU; (2) computer instructions for transmitting a subset of the first set of RLC data blocks, wherein each transmitted RLC data block comprises at least a portion of the first LLC PDU, which portion has not previously been transmitted in an RLC data block; (3) computer instructions for receiving a second LLC PDU corresponding to a second PFC and forming a second set of RLC data blocks corresponding to the second LLC PDU; (4) computer instructions for transmitting the second set of RLC data blocks, wherein each transmitted RLC data block comprises at least a portion of the second LLC PDU, which portion has not previously been transmitted in an RLC data block; and (5) computer instructions for, after having transmitted the second set of RLC data blocks, transmitting the remainder of the first set of RLC data blocks, wherein each transmitted RLC data block comprises at least a portion of the first LLC PDU, which portion has not previously been transmitted in an RLC data block. In other embodiments, data processing system 1002 is configured to perform steps described above without the need for software 1002. That is, for example, data processing system 1002 may consist merely of one or more ASICs. Hence, features of the present invention described above may be implemented in hardware and/or software.

While various embodiments of the present invention have been described above, it should be understood that they have been presented by way of example only, and not limitation. Thus, the breadth and scope of the present invention should not be limited by any of the above described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method in a wireless communication apparatus for transmitting radio link control (RLC) data blocks corresponding to first and second logical link control (LLC) protocol data units (PDUs), wherein the wireless communication apparatus includes a protocol stack having a LLC layer, a RLC layer, and a physical link (PHY) layer, wherein the RLC layer includes an RLC entity that receives the first and second LLC PDUs from the LLC layer, the method comprising the following steps performed by the RLC entity:
   upon receiving the first LLC PDU from the LLC layer, forming a first set of RLC data blocks corresponding to the first LLC PDU;
   commencing to transmit the first set of RLC data blocks to the PHY layer for radio transmission, wherein each transmitted RLC data block comprises a portion of the first LLC PDU;
   prior to completion of transmission of the first set of RLC data blocks:
      receiving the second LLC PDU from the LLC layer;
      determining whether the second LLC PDU has a higher transmission priority than a transmission priority of the first LLC PDU; and
      upon determining that the second LLC PDU has a higher transmission priority than the transmission priority of the first LLC PDU, ceasing transmission of the first set of RLC data blocks, and transmitting to the PHY layer, one or more RLC data blocks corresponding to the second LLC PDU; and
   completing transmission of the first set of RLC data blocks to the PHY layer after transmitting the one or more RLC data blocks corresponding to the second LLC PDU;
   wherein upon determining that the second LLC PDU has an equivalent transmission priority as the transmission priority of the first LLC PDU, the method further comprises:
      alternately transmitting to the PHY layer, RLC data blocks corresponding to the first LLC PDU and the second LLC PDU until the first or second LLC PDU has been completely transmitted as RLC data blocks.

2. The method of claim 1, further comprising, after alternately transmitting the RLC data blocks corresponding to the first LLC PDU and the second LLC PDU until the first or second LLC PDU has been completely transmitted as RLC data blocks:
   when one of the LLC PDUs has not been completely transmitted, transmitting to the PHY layer, the remaining RLC data blocks corresponding to the LLC PDU that has not been completely transmitted.

3. A wireless communication apparatus for transmitting radio link control (RLC) data blocks corresponding to first and second logical link control (LLC) protocol data units (PDUs), wherein the wireless communication apparatus comprises a non-transitory memory and one or more data processing circuits that implement the following when executing software instructions stored in the memory:
   a protocol stack comprising:
      a LLC layer that forms the first and second LLC PDUs;
      a RLC layer comprising an RLC entity that receives the first and second LLC PDUs from the LLC layer and forms the RLC data blocks corresponding to the first and second LLC PDUs; and
      a physical link (PHY) layer that receives the RLC data blocks from the RLC entity and transmits radio signals comprising the RLC data blocks;
   wherein the RLC entity is configured to:
      form a first set of RLC data blocks corresponding to the first LLC PDU upon receiving the first LLC PDU from the LLC layer;
      commence transmitting the first set of RLC data blocks to the PHY layer for radio transmission, wherein each transmitted RLC data block comprises a portion of the first LLC PDU;
      receive the second LLC PDU from the LLC layer prior to completion of transmission of the first set of RLC data blocks;
      determine whether the second LLC PDU has a higher transmission priority than a transmission priority of the first LLC PDU;
      upon determining that the second LLC PDU has a higher transmission priority than the transmission priority of the first LLC PDU:
         cease transmission of the first set of RLC data blocks, and transmit to the PHY layer, one or more RLC data blocks corresponding to the second LLC PDU; and
         after transmitting the one or more RLC data blocks corresponding to the second LLC PDU, complete transmission of the first set of RLC data blocks to the PHY layer; and
      upon determining that the second LLC PDU has an equivalent transmission priority as the transmission priority of the first LLC PDU, alternately transmit to the PHY layer, RLC data blocks corresponding to the first LLC PDU and the second LLC PDU until the first or second LLC PDU has been completely transmitted as RLC data blocks.

4. The wireless communication apparatus of claim 3, wherein after alternately transmitting the RLC data blocks corresponding to the first LLC PDU and the second LLC PDU until the first or second LLC PDU has been completely transmitted as RLC data blocks, when one of the LLC PDUs has not been completely transmitted, the RLC entity is further configured to transmit to the PHY layer, the remaining RLC data blocks corresponding to the LLC PDU that has not been completely transmitted.

* * * * *

UNITED STATES PATENT AND TRADEMARK OFFICE
CERTIFICATE OF CORRECTION

PATENT NO. : 9,532,372 B2
APPLICATION NO. : 14/590792
DATED : December 27, 2016
INVENTOR(S) : Diachina et al.

It is certified that error appears in the above-identified patent and that said Letters Patent is hereby corrected as shown below:

On the Title Page

On Page 2, in item (56), under "OTHER PUBLICATIONS", in Column 2, Line 21, delete "Oct. 16, 2006, Oct. 16, 2006" and insert -- Oct. 16, 2006, --, therefor.

In the Drawings

In Fig. 6, Sheet 6 of 10, for Step "602", in Line 1, delete "an a" and insert -- and a --, therefor.

In the Specification

In Column 1, Line 9, delete "2013," and insert -- 2013 (now Pat. No. 8,953,638), --, therefor.

In Column 3, Line 66, delete "illustrates that" and insert -- illustrates --, therefor.

In Column 5, Line 63, delete "value TFI," and insert -- value $TFI_1$, --, therefor.

In Column 6, Line 34, delete "header" and insert -- header of --, therefor.

In Column 6, Line 42, delete "header" and insert -- header of --, therefor.

In Column 8, Line 36, delete "RCL" and insert -- RLC --, therefor.

In Column 8, Line 38, delete "RCL" and insert -- RLC --, therefor.

In Column 8, Line 40, delete "RCL" and insert -- RLC --, therefor.

In Column 8, Line 40, delete "priorities" and insert -- priorities. --, therefor.

In Column 8, Line 42, delete "RCL" and insert -- RLC --, therefor.

Signed and Sealed this
Fifth Day of December, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,532,372 B2

In Column 9, Line 28, delete "step 402" and insert -- step 402, --, therefor.

In Column 10, Line 40, delete "wireless interface 116" and insert -- wireless interface --, therefor.

In Column 10, Line 65, delete "included" and insert -- include --, therefor.

In Column 11, Line 1, delete "propriety" and insert -- priority --, therefor.

In Column 11, Line 4, delete "propriety" and insert -- priority --, therefor.

In Column 11, Line 5, delete "MAD/PHY" and insert -- MAC/PHY --, therefor.

In Column 11, Line 61, delete "step" and insert -- steps --, therefor.

In Column 12, Line 34, delete "step 634" and insert -- step 634, --, therefor.

In Column 13, Line 2, delete "step 656" and insert -- step 656, --, therefor.